(12) United States Patent
Hu et al.

(10) Patent No.: US 6,555,151 B2
(45) Date of Patent: Apr. 29, 2003

(54) PROCESS FOR MAKING AND USING A LOW BEVERAGE SOLUBLE IRON CONTENT ADSORBENT AND COMPOSITION MADE THEREBY

(75) Inventors: Yatao Hu, Wayne, PA (US); Cuong Tran, Bethlehem, PA (US)

(73) Assignee: PQ Corporation, Berwyn, PA (US)

( * ) Notice: Subject to any disclaimer, the term of this patent is extended or adjusted under 35 U.S.C. 154(b) by 0 days.

(21) Appl. No.: 09/760,353

(22) Filed: Jan. 12, 2001

(65) Prior Publication Data

US 2002/0094364 A1 Jul. 18, 2002

(51) Int. Cl.[7] .............................. C12H 1/02; C12H 1/04
(52) U.S. Cl. ....................................... 426/422; 426/423
(58) Field of Search ................................. 426/422, 423

(56) References Cited

U.S. PATENT DOCUMENTS

| | | | |
|---|---|---|---|
| 3,617,301 A | | 11/1971 | Barby |
| 3,676,367 A | * | 7/1972 | Raible |
| 3,846,337 A | * | 11/1974 | Young |
| 4,134,857 A | | 1/1979 | Bradley et al. |
| 4,508,742 A | | 4/1985 | McLaughlin et al. |
| 4,758,440 A | * | 7/1988 | van der Heem |
| 4,847,235 A | * | 7/1989 | van der Heem |
| 5,641,532 A | * | 6/1997 | Pflaumer et al. |

FOREIGN PATENT DOCUMENTS

| | | |
|---|---|---|
| EP | 0 124 685 | 11/1984 |
| EP | 0 287 232 | 10/1988 |
| FR | 2 471 949 | 6/1981 |
| WO | WO 00/66705 | 11/2000 |

OTHER PUBLICATIONS

Abstract of Japanese Patent No. 3008710 (Published Jan. 16, 1991).

Abstract of Russion Patent No. 2160777 (Published Dec. 20, 2000).

International Search Report dated Sep. 24, 2002 (from International Application No. PCT/US02/01005).

U.S. patent application Ser. No. 09/304,486, Bennett et al., filed May 13, 1999.

* cited by examiner

*Primary Examiner*—Anthony J. Weier
(74) *Attorney, Agent, or Firm*—RatnerPrestia

(57) ABSTRACT

An adsorbent removes certain undesirable components from beverages, such as beer, and has a low beverage soluble iron (BSI) content. These undesirable components include contaminants which cause chill haze. The adsorbent includes two components, a silica component and a polyphosphate sequestering agent component, such as sodium tripolyphosphate (STPP). The process for using the adsorbent involves first contacting a beverage with an adsorbent to adsorb at least a portion of the undesirable components then separating the adsorbent from the beverage. The adsorbent may be formed by one of two methods or a combination of both. The first method involves adding the polyphosphate sequestering agent to a reactant, such as a sodium or potassium silicate solution, prior to or during the gelation stage. A second method involves adding the polyphosphate sequestering agent to the water wash after a hydrogel is formed. The BSI of the adsorbent is substantially reduced using the first method, but the total iron content of the adsorbent appears to increase. The second method decreases both the BSI and the total iron content of the silica gel.

22 Claims, 2 Drawing Sheets

PROCESS FOR MAKING AND USING A LOW BEVERAGE SOLUBLE IRON CONTENT ADSORBENT AND COMPOSITION MADE THEREBY

FIELD OF THE INVENTION

The present invention pertains to adsorbents having low beverage soluble iron content in beverages, such as beer.

BACKGROUND OF THE INVENTION

Silica gels have been used to remove certain undesirable components from a certain beverages, typically by adsorption. For example, silica gels have been used in brewing processes to stabilize beer by adsorbing lower molecular weight proteins (e.g., less than 40,000 daltons) that are generally responsible for haze formation. Commercial silica gels are manufactured from silicate solutions and mineral acids and contain small quantities of metals, such as iron, that are partially soluble in beverages and contaminate them. The portion of the iron content of the silica gel which is soluble in a beverage is known as "beverage soluble iron" (often abbreviated as "BSI"). Although an adsorbent's BSI can be readily identified, the BSI varies with different beverages, pH's, and temperatures, among other factors. Such dissolved metals may destabilize colloidal constituents of beverages, inducing lower quality. For example, high dissolved iron levels adversely affect beer taste and shelf life.

Some efforts have been made to stabilize beer and more specifically to treat beer to prevent chill haze and metal contamination. For example, U.S. Pat. No. 4,134,857 to Bradley discloses reducing the BSI by washing a filter aid such as diatomite with an aqueous solution of tannic or gallic acid or mixtures thereof, with the aid of citric acid for color control.

The presence of high iron levels in beverages can be deleterious to the taste and long-term stability ("shelf life") of the beverage. Accordingly, it would be advantageous to have a cost-effective adsorbent having a low BSI.

SUMMARY OF THE INVENTION

In view of its purposes, the present invention provides an adsorbent having a low beverage soluble iron (BSI) content for use in the removal of certain components from a beverage to reduce chill haze. The adsorbent is made by introducing a polyphosphate sequestering agent during the production of the adsorbent. In particular, the process involves contacting a polyphosphate sequestering agent, such as sodium tripolyphosphate, with a reactant of a silica gel or a wash solution containing a precursor of the silica gel, or both. The reactant may be a sodium or potassium silicate solution used in conjunction with a mineral acid to make a silica hydrogel. The precursor may be a silica hydrogel formed by mixing a sodium or potassium silicate solution with a mineral acid. From the precursor, the adsorbent is formed. Thus, the composition of the present invention is an adsorbent comprising a silica component and a polyphosphate sequestering agent component.

The present invention also provides for a process of using the adsorbent to reduce certain contaminants from beverages. The process and composition of the present invention allow for the removal of contaminants which tend to form chill haze in beer, for example. The process involves contacting a beverage with an adsorbent of the present invention to adsorb at least a portion of the components then separating the adsorbent from the beverage, such as by filtering.

It is to be understood that both the foregoing general description and the following detailed description are exemplary, but not restrictive, of the invention.

BRIEF DESCRIPTION OF THE DRAWING

The invention is best understood from the following detailed description when read in connection with the accompanying drawing, in which.

DETAILED DESCRIPTION OF THE INVENTION

The present invention relates to a process and composition for removing contaminants and preventing chill haze formation in beverages, while minimizing the leaching of iron from the adsorbent to the beverage. As used herein, the term "beverage" is intended to encompass all beverages which include certain proteins which, if left in the beverage, tend to form haze upon chilling but can be adsorbed by the present invention. Such beverages include a number of vegetable based or malt based beverages, such as beer, ale, and wine, and fruit juices. The present invention is particularly applicable to beer, including lager, Pilsner, Munich beers and ale, porter, and stout.

As used herein, the term "removing" as in "removing components from a beverage" implies removing at least some percentage of selected components, such as the proteins which cause chill haze, but does not necessarily contemplate removing one hundred percent of any of these components. In some cases, however, a component may be removed to such an extent that it cannot be detected by known quantitative analysis procedures.

As described below, the present invention makes use of a polyphosphate sequestering agent while making the silica gel adsorbent of the present invention. A polyphosphate sequestering agent is a compound which includes the anion $P_nO_{3n+1}$ and is capable of sequestering cations, most notably in this case the ferric or ferrous cation. The polyphosphate sequestering agent may include an alkali or alkaline earth metal in its formulation. It has been found that sodium tripolyphosphate, $Na_5P_3O_{10}$, is suitable for purposes of the present invention.

Methods of making the adsorbent of the present invention are discussed in connection with FIGS. 1 and 2. In general, these methods involve first contacting a polyphosphate sequestering agent with a reactant of the silica gel or a wash solution containing a precursor of the silica gel (or a combination of both), then forming the silica gel adsorbent from the precursor. A reactant of the silica gel may include a starting material which undergoes a chemical reaction with another starting material to form a precursor of the silica gel. Reactants include sodium or potassium silicate solutions which, when combined with an acid and forced through a jet nozzle under certain conditions, form a hydrogel. A precursor is a material which has substantially the same chemical composition as the final silica gel, but may undergo some physical changes, such as changes in porosimetry properties, changes in moisture content, or a physical retention of another compound within its pores. Forming is done by conventional means and includes any hydrothermal treatment (although not done in the examples discussed below), washing, milling, and drying, as discussed below.

Figure 1:
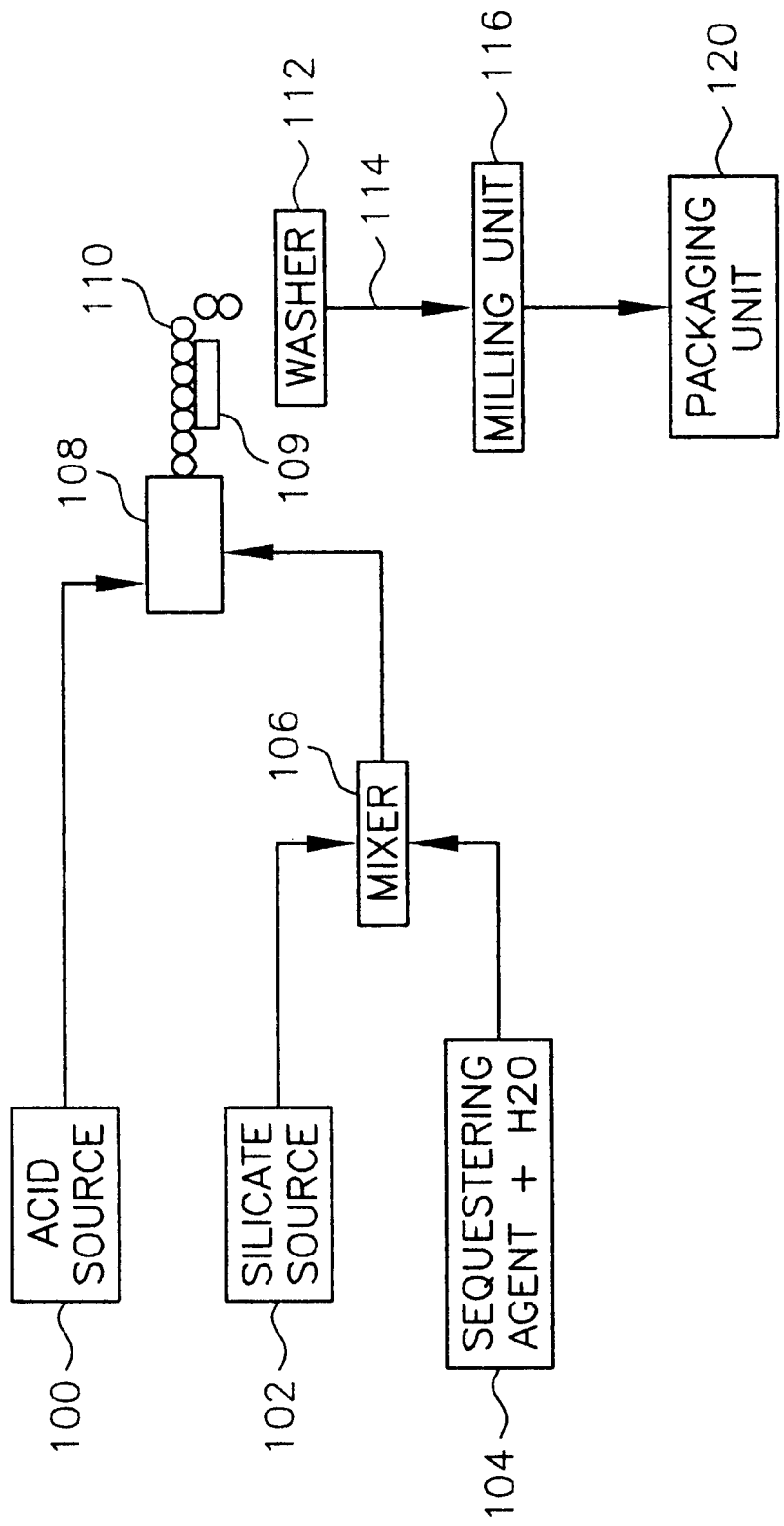
FIG. 1 is a schematic view of a first embodiment of a process for making an adsorbent according to the present invention.

In the embodiment shown in FIG. 1, a polyphosphate sequestering agent, such as sodium tripolyphosphate (STPP), is mixed with sodium silicate or potassium silicate to form a mixture. The sequestering agent source 104 may provide a solution of STPP dissolved in water. This solution combines with either the potassium or sodium silicate provided from the silicate source 102 to form STPP-doped silicate mixture in a mixer 106. The STPP-doped silicate mixture is mixed for a sufficient period of time to achieve adequate mixing, such as between 2–6 hours, although this may vary dependent upon other factors. The amount of polyphosphate sequestering agent to be added depends on the iron content of the silicate, which can be determined by conventional quantitative analysis techniques. The sodium tripolyphosphate may be added to the sodium or potassium silicate solution in an amount to achieve a sodium tripolyphosphate: iron molar ratio of between about 0.5:1 and 50:1, preferably between about 5:1 and 10:1.

Next, the silica gel is formed by neutralizing the STPP-doped silicate mixture with an acid, such as a mineral acid. Sulfuric acid is used in the examples below. Other than the addition of the STPP to the silicate solution, the production of the silica gel adsorbent containing the STPP component can be effected in any known manner for making conventional silica gel adsorbents. For example, an acid source 100 may be used to supply an acid which is combined with the STPP-doped silicate mixture to form a hydrosol. In particular, silica hydrosols are formed by rapidly mixing aqueous solutions of an acid and sodium or potassium silicate. It has been found advantageous in this invention to adjust the concentrations and flow rates or proportions of the reactants so that the hydrosol contains between about 5–30% $SiO_2$ by weight, preferably between 10 to 20% $SiO_2$ by weight. It has also been found that it is preferable to fully neutralize all of the alkali metal present in the silicate solution and, preferably, to provide the acid in excess of between 5 molar percent and 30 molar percent (preferably 15–25 molar percent) greater than the stoichiometrically required amount of acid to fully neutralize the sodium or potassium. Thus, there is preferably no or substantially no unreacted $Na_2O$ or $K_2O$ in the silica hydrosol.

As shown in FIG. 1, the hydrosol having the polyphosphate component is forced through a nozzle 108. From the nozzle, the hydrosol falls onto a moving belt 109 and is allowed to set to form a hydrogel all in a known manner. The hydrogel is allowed to age on the belt, for a sufficient period of time for the hydrogel to become firm for further processing. In one embodiment, the hydrosol contains about 18% $SiO_2$, has a pH below about 1, and gels in a matter of a few minutes. Such a hydrosol forms beads on the belt 109.

The hydrogel is then washed in the washer 112 with acidified water to remove salts from the hydrogel. Multiple washings may occur as is well-known in the art, until the salt concentration in the effluent is at or below an acceptable level, preferably at or close to zero. The washing may occur as a batch process, concurrent flow, or countercurrent flow. It has been found desirable to acidify the water, for example by using sulfuric acid. The pH of the wash water may be between 2.5 and 4.0, preferably between 3.2 and 3.4.

The washed hydrogel is then passed via line 114 to milling unit 116 where it is milled. Milling may continue until the average particle size is between about 10 to about 40 microns, although the particular size will depend on the needs of the end use and other conditions in the beverage purification process. In general, the particles should be in the form of a powder and should not be milled too small such that filtration becomes difficult. The adsorbent is then packaged in the packaging unit 120. The adsorbent formed according to the embodiment shown in FIG. 1 has a reduced BSI.

Figure 2:
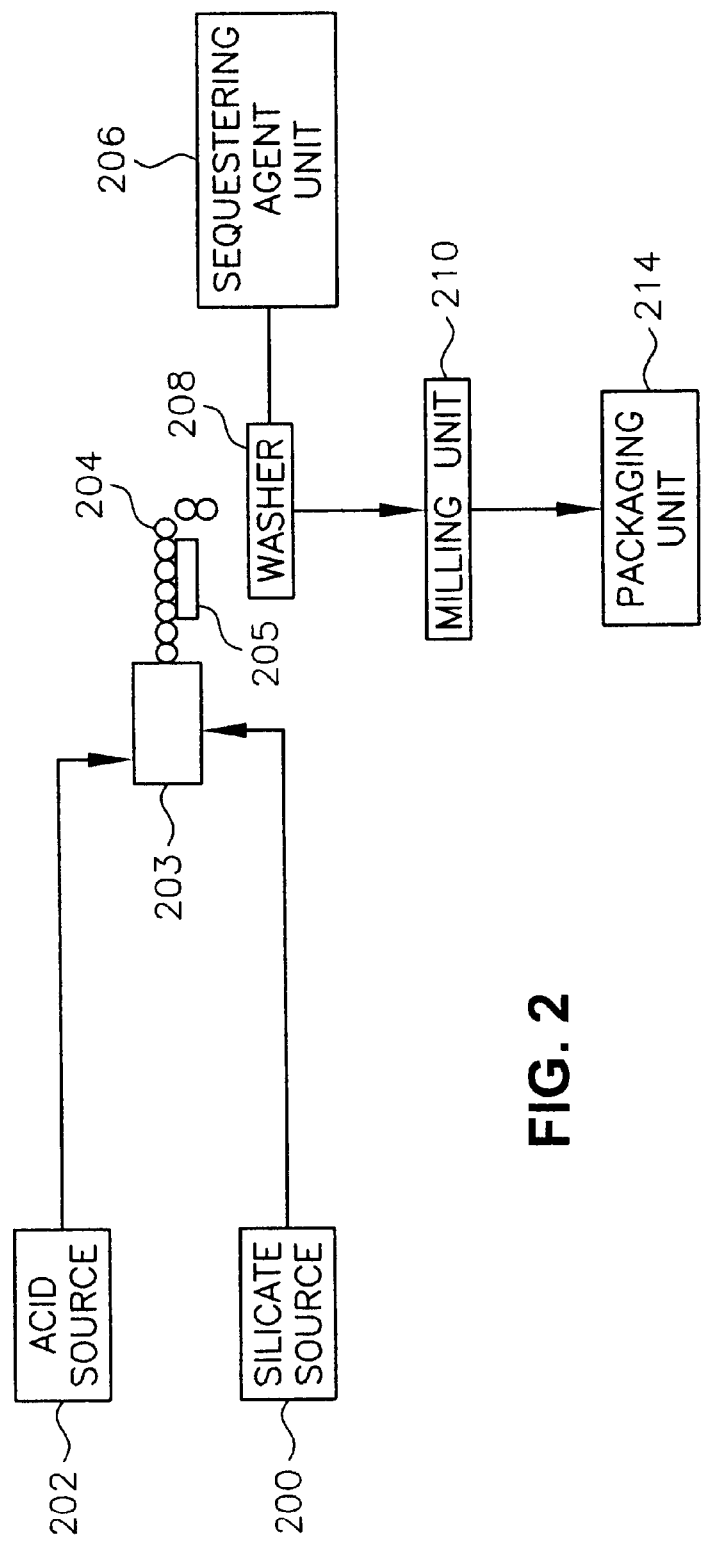
FIG. 2 is a schematic view of a second embodiment of a process for making an adsorbent according to the present invention.

In the embodiment shown in FIG. 2, the polyphosphate sequestering agent is mixed with the acidified wash water as opposed to with the silicate solution, with everything else in the processing generally the same. In particular, a reactant such as sodium or potassium silicate from silicate source 200 is mixed with an acid from acid source 202. This mixture is forced through a nozzle 203 to form a hydrosol which sets into a hydrogel 204, all in a known way, typically on a belt or container 205. The hydrogel is then aged, as described above, and directed to a washer 208. All of the relative concentrations are the same as in the embodiment shown in FIG. 1, except that the flow rates of the reactants are adjusted such that about 15–20% $SiO_2$ is present in the hydrosol.

Instead of containing acidified wash water, washer 208 contains an acidified mixture of water and the polyphosphate sequestering agent from unit 206. The polyphosphate compound may be STPP. The sodium tripolyphosphate may be added to the acidified mixture in an amount to achieve a concentration sufficient to reduce the amount of BSI to an acceptable level. The particular concentration of the polyphosphate sequestering agent will depend on the amount of iron in wash water 208 (including both on the silica gel and in the acidified water), among other factors. In an embodiment of the invention, the concentration is between 0.01 and 1 weight percent sodium tripolyphosphate based on sodium silicate, preferably between 0.05 and 0.5 weight percent. In an alternative embodiment and as used in the examples below, the amount of STPP to be added may be accomplished by determining the moles of iron in the initial hydrogel. In this case, the moles of STPP (i.e., the total amount of STPP used during the washing step) is adjusted to the moles of iron to range from 5:1 to 20:1. Thus, with more wash water being used, the less concentrated it is with STPP.

The acidified mixture may be prepared by first dissolving STPP in water, with an STPP level of anywhere between 10–800 ppm, preferably between about 100–400 ppm (although this concentration may vary as mentioned above on the basis of either the silicate or the iron in the hydrogel), and then adjusting the pH of the solution to between 2.5 and 4.0, preferably 3.3 and 3.5, by using sulfuric acid. The silica gel is formed by washing the hydrogel 204 with the sequestering agent mixture.

As before, the washed hydrogel then enters the milling unit 210 and finally the packaging unit 214. The embodiment shown in FIG. 2 appears to achieve the best results with respect to the reduction of both the total iron content and the beverage soluble iron content of the adsorbent. An adsorbent combining the features of the embodiments shown in FIGS. 1 and 2 may also be made. In other words, an STPP-doped silicate solution may be used to form the hydrogel which may be washed with STPP-doped was water.

It is believed that a silica gel having a wide range of porosimetry properties can be used with the present invention. More specifically, it is believed that no particular ranges of pore volume, pore diameter, surface area, or particle size are critical for purposes of the present invention. Nonetheless, a silica hydrogel having a pore volume of between about 1.5 to 2.5 cc/g; an average pore diameter of between about 75 and 125 Angstroms; a surface area of between about 750–850 m$^2$/g; and a moisture content of about 60–70% H$_2$O has been found to be suitable. The invention is also applicable to xerogels that have undergone hydrothermal treatment (described below) to reduce the surface area, after being washed with STPP-doped water. Such xerogels may have a pore volume of between about 1.0 to 1.4 cc/g; an average pore diameter of between about 75 and 125 Angstroms; and a surface area of between about 250–450 m$^2$/g.

Achieving such silica gels is well-known in the art. For example, exposing the silica gel to elevated temperatures at alkaline pH leads to a rearrangement of the gel structure; surface area is reduced and the mean pore diameter of the final product is increased. This process is known in the art as "hydrothermal treatment." An acid-set gel needs to be adjusted to alkaline or neutral pH for this to occur. Drying conditions will also affect porosimetry properties; rapid drying tends to result in higher pore volumes. The silica content of the hydrosol also affects porosimetry. All of these effects are well-known to those skilled in the art and are described in many publications and patents.

The adsorbent is used in a process for removing components from a beverage to reduce chill haze, while having a relatively low BSI. As used in this context, the term "low BSI" is relative to the BSI of an adsorbent made by an identical process except for no exposure to a polyphosphate sequestering agent. In particular, as shown in the examples below, the adsorbent of the present invention may have a BSI less than 50% of the BSI of a comparative adsorbent, and preferably less than 25%, most preferably less than 10%, of a comparative adsorbent. The process for removing contaminants is accomplished by simply contacting the adsorbent of the present invention with the beverage, preferably in a manner which facilitates the adsorption, in a conventional manner. The adsorption step may be any convenient batch or continuous process. In any case, agitation or other mixing will enhance the adsorption efficiency of the adsorbent.

Adsorption may be conducted at any convenient temperature at which the beverage is a liquid. Typically, the beverage temperature is between about 29° and 40° F. The beverage and adsorbent are contacted as described above for a period of time sufficient to achieve the desired component percentage reduction in the treated beverage. The specific contact time will vary somewhat on the selected process, i.e., batch or continuous; with the type and condition of the beverage to be treated; with the concentration of the components in the beverage; and with the particular adsorbent being used. In cases where the contact time is already set, the particle size of the adsorbent may be varied in a known way to meet the various process conditions. In addition, the relative quantity of adsorbent brought into contact with the beverage will also affect the amount of components removed. The amount of adsorbent added to the beer is measured in parts per million (e.g., grams of adsorbent per 1,000,000 grams of beer). The adsorbent usage may be from about 100 ppm to about 1,000 ppm, and preferably from about 400 ppm to about 800 ppm.

During the refinement of beer, other additives are sometimes used to adsorb components and to perform other functions. The adsorbent of the present invention achieves the functions of the present invention in the presence of other known additives in the industry. For example, foam stabilizers, anti-oxidants, perlite, and diatomaceous earth are often added to beer prior to filtering. Diatomaceous earth, for example, is used as a filter aid but often undesirably contributes iron to the beer.

Regardless of the particular adsorbent of the present invention used, the adsorbent (or adsorbents) is separated from the component-depleted beverage in any known manner following adsorption. For example, a filtration device may be used to separate the adsorbent from the component-depleted beverage. The separation may be effected by one or more filtering stages.

The adsorbent of the present invention is an adsorbent comprising a silica component and a polyphosphate sequestering agent component. It is believed that the polyphosphate sequestering agent chemically bonds to the silica gel in the embodiment shown in FIG. 1, while it is merely physically retained in the pores of the silica gel in the embodiment shown in FIG. 2. Thus, in the former case, the silica gel and polyphosphate sequestering agent might alter one another somewhat; thus, in the final product they are referred to as a silica gel "component" and a polyphosphate sequestering agent "component." In the latter embodiment, however, it is believed that the two constituents do not undergo any chemical interaction.

EXAMPLES

The following examples are included to more clearly demonstrate the overall nature of the invention. These examples are exemplary, not restrictive, of the invention.

Example 1

In one example of this process to prepare the product of the present invention, the STPP was dissolved in water, and allowed to mix with sodium silicate for five hours at room temperature. This STPP-doped silicate mixture contained 0.1 wt. % of STPP on the basis of sodium silicate. Sulfuric acid was used to neutralize the STPP-doped silicate mixture. The acid solution had a concentration of 14.4% H$_2$SO$_4$ and a temperature of about 72° F. The silicate solution had a nominal SiO$_2$:Na$_2$O weight ratio of 3.25, a solids level of 22%, and a temperature of about 72° F. The concentrations and proportions of silicate and acid were adjusted so that the hydrosol contained 10% SiO$_2$ and so that there was 20% more acid than needed to neutralize the sodium present in the silicate solution. The hydrosol was allowed to gel in a container at 122° F. The gel time was a few hours. The gel was then aged at 122° F. and washed with acidified water, rendered acidic by sulfuric acid. The acidified water, which was used to remove sodium sulfate, had a pH of 3.3. This is Sample 1 as depicted in Table 1.

For comparison, a Control 1 was made using the same process as in Sample 1 except that the STPP was not added.

The iron level in the gels represents the total iron (Fe). Both the total iron and the beverage soluble iron (BSI) were measured by atomic absorption (AA). Sample 1 had a total iron content of 83 ppm and BSI content of 2.4 ppm, while Control 1 had a total iron content of 27 ppm and a BSI content of 7 ppm.

Example 2

In another example of the process of the present invention, a silica gel was made with the same process as in Example 1, except that the level of STPP was increased. The STPP in Example 2 was 0.15 wt. % on the basis of sodium silicate. A Control 2 was also made for comparison, using the same process as in Sample 1 except that no STPP was used in the control.

Sample 2 had a total iron content of 54 ppm and a BSI content of 3.6 ppm, while Control 2 had a total iron content of 38 ppm and a BSI content of 14.6 ppm.

Example 3

In an example of the second embodiment used to produce the adsorbent of this invention, a silica gel was made by neutralizing sodium silicate with sulfuric acid. The acid solution had a concentration of 41.8% $H_2SO_4$ and a temperature of about 80° F. The silicate solution had a nominal $SiO_2$:$Na_2O$ weight ratio of 3.2, a solids level of 31.4%, and a temperature of about 80° F. The concentration and the proportions of silicate and acid were adjusted so that the hydrosol contained 18% silica and so that there were 20% more acid than needed to neutralize the sodium present in the silicate solution. An STPP-doped acid water solution was prepared by first dissolving STPP in water, with an STPP level of 50 ppm on the basis of water, and then adjusting the pH of the solution to 3.4 by adding sulfuric acid. The proportions of gel and wash water were adjusted so that the total amount of STPP used was equivalent to 0.1 wt. % on the basis of sodium silicate. This is Sample 3 as represented on Table 1.

A Control 3 was made by washing the same gel with a pH of 3.4 acid water. No STPP was used in the Control. Sample 3 had a total iron content of 5 ppm and a BSI content of 0.2 ppm, while Control 3 had a total iron content of 19 ppm and a BSI content of 6.3 ppm.

Example 4

In another example of the second embodiment of the process used to produce the adsorbent, the same unwashed silica hydrogel of Example 3 was used. The STPP-doped acid water wash solution was prepared by first adjusting the pH of the solution to 3.5, and then dissolving STPP in the acid water, with an STPP level of 200 ppm on the basis of water. The proportions of gel and wash water were adjusted so that the total amount of STPP used was equivalent to 0.5 wt. % on the basis of sodium silicate. The silica gel produced under these conditions is designated as Sample 4 on Table 1.

A Control 4 was also made under the same conditions using the same pH of the acid water of 3.5, except that no STPP was added.

Sample 4 had a total iron content of 6.5 ppm and the BSI content was undetectable by atomic adsorption (AA). Control 4 had a total iron content of 20 ppm and a BSI content of 5 ppm.

All of the examples show a reduction in BSI content when using an adsorbent of the present invention. The examples using the embodiment shown in FIG. 2 also showed a reduction in total iron content.

As used herein, an adsorbent's BSI was determined in accordance with procedure No. Q.2.01.004, revision Apr. 26, 1994, from the American Society of Brewing Chemist Methods, Filter Aids-4 and Beer-18B, incorporated herein by reference. In general, this procedure involves suspending a sample of the adsorbent in decarbonated beer for a specified time and then separating by filtration. The beer filtrate is collected and analyzed by atomic adsorption spectroscopy by the method of standard additions. Then, the iron content of the untreated beer is subtracted from the iron content of the treated beer, with the difference being multiplied by a factor, and is the product being reported as beer soluble iron expressed in ppm.

Although illustrated and described herein with reference to certain specific embodiments and examples, the present invention is nevertheless not intended to be limited to the details shown. Rather, various modifications may be made in the details within the scope and range of equivalents of the claims and without departing from the spirit of the invention.

What is claimed is:

1. A process for making a silica gel adsorbent having a low beverage soluble iron content, said process comprising the steps of:

contacting a polyphosphate sequestering agent with at least one of:
  a) at least one reactant that forms a precursor of said silica gel, or
  b) a wash solution for washing said precursor of said silica gel; and forming said silica gel adsorbent from said precursor.

2. A process in accordance with claim 1, wherein:

said reactant comprises sodium silicate or potassium silicate; and the contacting step consists of contacting said polyphosphate sequestering agent with said sodium silicate or potassium silicate and forming a solution of said polyphosphate sequestering agent and said sodium silicate or potassium silicate to form a mixture.

3. A process in accordance with claim 2 further comprising adding an acid to said mixture to form a hydrosol.

4. A process in accordance with claim 2, wherein said polyphosphate sequestering agent is sodium tripolyphosphate.

5. A process in accordance with claim 1, wherein:

the contacting step consists of contacting said polyphosphate sequestering agent with said wash solution containing said precursor; and said precursor comprises a hydrogel formed by mixing an acid with sodium silicate or potassium silicate.

6. A process in accordance with claim 5, wherein said polyphosphate sequestering agent is sodium tripolyphosphate.

7. A process in accordance with claim 1, wherein the contacting step comprises contacting said polyphosphate sequestering agent with said reactant and with said wash solution containing said precursor.

8. A process for making a silica gel adsorbent having a low beverage soluble iron content, said process comprising the steps of:

mixing a polyphosphate sequestering agent with sodium silicate or potassium silicate to form a mixture;

adding an acid to said mixture to form a silica hydrosol having a polyphosphate component and allowing said hydrosol to set into a hydrogel;

washing said hydrogel with acidified water; and milling said washed hydrogel to form the silica gel adsorbent.

9. A process according to claim 8, wherein said acid is a mineral acid.

10. A process according to claim 8, wherein said polyphosphate sequestering agent is sodium tripolyphosphate.

11. A process according to claim 10, wherein:

the sodium silicate or potassium silicate has an iron content;

the sodium tripolyphosphate is added to said sodium silicate or potassium silicate in an amount to achieve a sodium tripolyphosphate:iron molar ratio of between 0.5:1 and 50:1;

the acid is added to said mixture in an amount of between 5 molar percent and 30 molar percent greater than the stoichiometrically required amount of acid to fully neutralize the sodium or potassium; and said acidified water has a pH of between 2.5 and 4.0.

12. A process according to claim 10, wherein:

the sodium silicate or potassium silicate has an iron content;

the sodium tripolyphosphate is added to said sodium silicate or potassium silicate in an amount to achieve a sodium tripolyphosphate: iron molar ratio of between 5:1 and 10:1;

the acid is added to said mixture in an amount of between 15 molar percent and 25 molar percent greater than the stoichiometrically required amount of acid to fully neutralize the sodium or potassium; and said acidified water has a pH of between 3.2 and 3.4.

13. A process for making a silica gel adsorbent having a low beverage soluble iron content, said process comprising the steps of:

mixing sodium or potassium silicate with an acid to form a hydrosol and allowing said hydrosol to set into a hydrogel;

washing said hydrogel with an acidified mixture of water and a polyphosphate sequestering agent; and milling said washed hydrogel to form the silica gel adsorbent.

14. A process according to claim 13, wherein said acid is a mineral acid.

15. A process according to claim 13, wherein said polyphosphate sequestering agent is sodium tripolyphosphate.

16. A process according to claim 15, wherein:

the sodium silicate or potassium silicate has an iron content;

the sodium tripolyphosphate is added to said acidified mixture in an amount to achieve a concentration of between 0.01 and 1 weight percent sodium tripolyphosphate based on sodium silicate;

the acid is added to said mixture in an amount of between 5 molar percent and 30 molar percent greater than the stoichiometrically required amount of acid to fully neutralize the sodium or potassium; and said acidified water has a pH of between 2.5 and 4.0.

17. A process according to claim 15, wherein:

the sodium silicate or potassium silicate has an iron content;

the sodium tripolyphosphate is added to said acidified mixture in an amount to achieve a concentration of between 0.05 and 0.5 weight percent sodium tripolyphosphate based on sodium silicate;

the acid is added to said mixture in an amount of between 15 molar percent and 25 molar percent greater than the stoichiometrically required amount of acid to fully neutralize the sodium or potassium; and said acidified water has a pH of between 3.3 and 3.5.

18. A composition for use in the removal of components from a beverage to reduce chill haze, said composition comprising an adsorbent consisting of a silica component and a polyphosphate sequestering agent component.

19. A composition in accordance with claim 18, wherein:

said silica component is a silica gel; and said polyphosphate sequestering agent component is sodium tripolyphosphate.

20. A silica gel adsorbent formed by the process of claim 1.

21. A silica gel adsorbent formed by the process of claim 8.

22. A silica gel adsorbent formed by the process of claim 13.

* * * * *